US009166822B2

(12) United States Patent
Haynes et al.

(10) Patent No.: US 9,166,822 B2
(45) Date of Patent: Oct. 20, 2015

(54) TRANSMISSION OF INSTANT MESSAGES ACCORDING TO AVAILABILITY

(75) Inventors: Thomas R. Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/140,570

(22) Filed: Jun. 17, 2008

(65) Prior Publication Data

US 2009/0313336 A1    Dec. 17, 2009

(51) Int. Cl.
*G06F 15/16* (2006.01)
*H04L 12/58* (2006.01)
*G06Q 10/10* (2012.01)

(52) U.S. Cl.
CPC .......... *H04L 12/5815* (2013.01); *G06Q 10/107* (2013.01); *H04L 51/043* (2013.01)

(58) Field of Classification Search
CPC ........ H04L 51/04; H04L 12/581; H04L 67/24
See application file for complete search history.

(56) References Cited

U.S. PATENT DOCUMENTS

| | | | |
|---|---|---|---|
| 6,286,033 B1* | 9/2001 | Kishinsky et al. | 709/203 |
| 6,301,609 B1* | 10/2001 | Aravamudan et al. | 709/207 |
| 6,816,578 B1* | 11/2004 | Kredo et al. | 379/88.17 |
| 6,987,847 B1* | 1/2006 | Murphy et al. | 379/201.1 |
| 2002/0072352 A1* | 6/2002 | Jana et al. | 455/414 |
| 2003/0018726 A1* | 1/2003 | Low et al. | 709/206 |
| 2005/0004984 A1* | 1/2005 | Simpson | 709/205 |
| 2005/0044144 A1* | 2/2005 | Malik et al. | 709/205 |
| 2005/0071433 A1* | 3/2005 | Shah | 709/207 |
| 2006/0242246 A1* | 10/2006 | Lyle et al. | 709/206 |
| 2006/0271696 A1* | 11/2006 | Chen et al. | 709/229 |
| 2007/0094360 A1* | 4/2007 | Forlenza et al. | 709/220 |
| 2007/0112925 A1* | 5/2007 | Malik | 709/206 |
| 2007/0130277 A1* | 6/2007 | Roskind et al. | 709/207 |
| 2008/0244026 A1* | 10/2008 | Holt et al. | 709/206 |
| 2010/0002859 A1* | 1/2010 | Hepworth et al. | 379/140 |
| 2012/0054288 A1* | 3/2012 | Wiese et al. | 709/206 |

OTHER PUBLICATIONS

Rogers, Rob, How to Delay Sending a Message in Outlook, Tech Recipes, Sep. 2006, http://www.tech-recipes.com/rx/1638/how_to_delay_sending_message_outlook.
Delay Sending SMS, Skype Community, 2007, http://forum.skype.com/index.php?showtopic=91864.

* cited by examiner

*Primary Examiner* — Peling Shaw
(74) *Attorney, Agent, or Firm* — Steven M. Greenberg, Esq.; CRGO Law

(57) ABSTRACT

Embodiments of the present invention address deficiencies of the art in respect to presence awareness for instant messaging and provide a novel and non-obvious method, system and computer program product for adaptive instant messaging awareness. In an embodiment of the invention, a method for adaptive instant messaging awareness can be provided. The method can include receiving an instant message for transmission to a user of an instant messaging system and determining that the user is not currently available to receive an instant message. The method can further include delaying transmission of the instant message to the user until a later determination that the user is available to receive an instant message.

18 Claims, 3 Drawing Sheets

TRANSMISSION OF INSTANT MESSAGES ACCORDING TO AVAILABILITY

BACKGROUND OF THE INVENTION

1. Field of the Invention

The present invention relates to the field of instant messaging and more particularly to presence awareness for instant messaging.

2. Description of the Related Art

Electronic mail, referred to in the art as e-mail, has proven to be the most widely used computing application globally. Though e-mail has been a commercial staple for several decades, due to the explosive popularity and global connectivity of the Internet, e-mail has become the preferred mode of asynchronous communications, regardless of the geographic separation of communicating parties. Today, more e-mails are processed in a single hour than phone calls. Clearly, e-mail as an asynchronous mode of communications has been postured to replace all other modes of communications excepting voice telephony.

In contrast to the asynchronous nature of e-mail, the recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of synchronous messaging technologies and protocols have been assembled to effectively deliver audio, video and data over the single data communications medium of the Internet. These synchronous messaging technologies include several, real-time human-to-human collaborative environments such as instant messaging and persistent chat rooms.

In the conventional instant messaging and chat environment, different collaborators can engage in a real-time exchange of messages including text messages, graphical information and even audiovisual information in a common messaging space. The common messaging space can accommodate a pair of conversants to a chat, or multiple conversants to a conference. In some circumstances, the initiation of the chat can be spontaneous upon one conversant recognizing the presence and availability of a partner conversant. In other circumstances, the initiation of the chat can be planned and can even subsist in a calendared event in a calendaring and scheduling system.

Conventional instant messengers rely upon presence awareness in assisting users with the establishment of a chat session with other users. Presence awareness refers to the ability of the instant messaging system to determine when a user is available to engage in a chat session. Generally, presence awareness can be manually established by each user through a selection of a number of states ranging from "I am available" to "Away from computer" to "Do Not Disturb". Alternatively, presence awareness can be established automatically by sensing activity in a computer. Idleness past a threshold duration of time can be indicative to the absence of a user and the state of the user can be set by the presence awareness logic of the instant messaging system accordingly.

Situations oftentimes arise where one individual intends to contact another individual through instant messaging, but cannot establish contact as the other individual is not sitting at his computer. This can be particularly frustrating if individuals are geographically separated—where it is not possible to physically locate the other individual in person. In situations like these, the initiating individual may wait to type and send the instant message until the other conversant is available for instant messaging. If enough time goes by or the initiating individual becomes distracted, he may forget to send the instant message at a later time. Even if he later remembers he had a message to send, the initiating individual may take a while to remember the subject matter of the instant message he intended to send. This can be annoying and time-consuming for the user. The inability to immediately contact the desired conversant in such circumstances can injure productivity through failed or canceled communications and lost time in recalling earlier intended communications.

BRIEF SUMMARY OF THE INVENTION

Embodiments of the present invention address deficiencies of the art in respect to presence awareness for instant messaging and provide a novel and non-obvious method, system and computer program product for adaptive instant messaging awareness. In an embodiment of the invention, a method for adaptive instant messaging awareness can be provided. The method can include receiving an instant message from a sender for transmission to a user of an instant messaging system and determining that the user is not currently available to receive an instant message. Optionally, the method may include receiving a command from the sender to delay transmission of the instant message until a later determination that the user is available to receive an instant message. The method can further include delaying transmission of the instant message to the user until a later determination that the user is available to receive an instant message.

In an aspect of the embodiment, the method also can include querying a presence server that stores presence information for the user and receiving an indicator from the presence server that the user is not available to receive an instant message. In another aspect of the embodiment, the method also can include waiting a predefined period of time, querying a presence server that stores presence information for the user, receiving an indicator from the presence server that the user is available to receive an instant message and transmitting the message to the user. In another aspect of the embodiment, the method also can include establishing a trust relationship with a presence serving application exposing an interface to receive presence information for the user of the instant messaging system and accepting a directive from the presence serving application through the interface to delay transmission of the instant message to the user.

In another embodiment of the invention, an adaptive instant messaging awareness method can be provided. The method can include receiving an instant message from a first user for transmission to a second user of an instant messaging system and determining that the second user is not currently available to receive an instant message. The method can further include receiving a command from the first user to delay transmission of the instant message until a later determination that the second user is available to receive an instant message and delaying transmission of the instant message to the second user until a later determination that the second user is available to receive an instant message Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
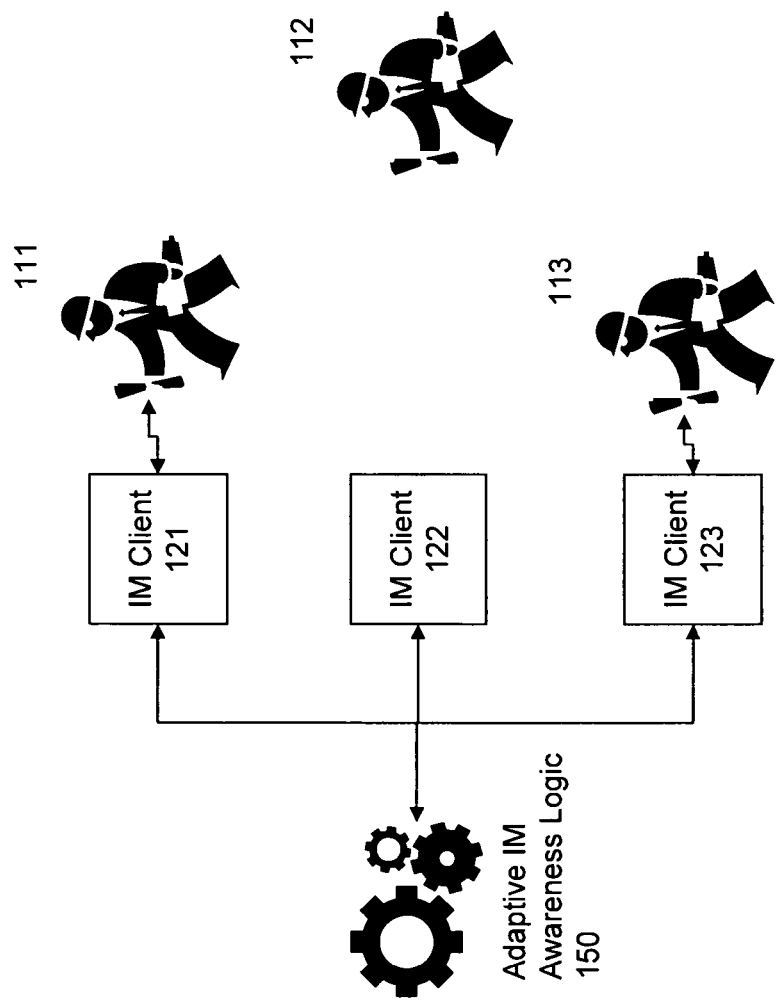
FIG. 1 is a pictorial illustration of a process for delaying transmission of an instant message according to availability in an instant messaging system.

Embodiments of the present invention address deficiencies of the art in respect to presence awareness for instant messaging and provide a novel and non-obvious method, system and computer program product for adaptive instant messaging awareness. In an embodiment of the invention, a method for adaptive instant messaging awareness can be provided. The method can include receiving an instant message for transmission to a user of an instant messaging system and determining that the user is not currently available to receive an instant message. The method can further include delaying transmission of the instant message to the user until a later determination that the user is available to receive an instant message In further illustration, FIG. 1 is a pictorial illustration of a process for delaying transmission of an instant message according to availability in an instant messaging system. As shown in FIG. 1, multiple different users 111, 112, 113 can communicate with one another through respective instant messenger clients 121, 122, 123, respectively. The different instant messenger clients 121, 122, 123 can be included as part of an instant messaging system and can support presence awareness. FIG. 1 further shows that at least one user 112 is away and not interacting with his instant messenger client 122. Even still, adaptive instant messaging awareness logic 150 can delay the transmission of an instant message to the instant messenger client 122 of user 112 until a later time, such as when the user 112 returns to his instant messenger client 122. In this way, a user, such as user 111, can create an instant message when the user 112 is not available and have the instant message automatically delivered at a later time to instant messaging client 122 of user 112.

Figure 2:
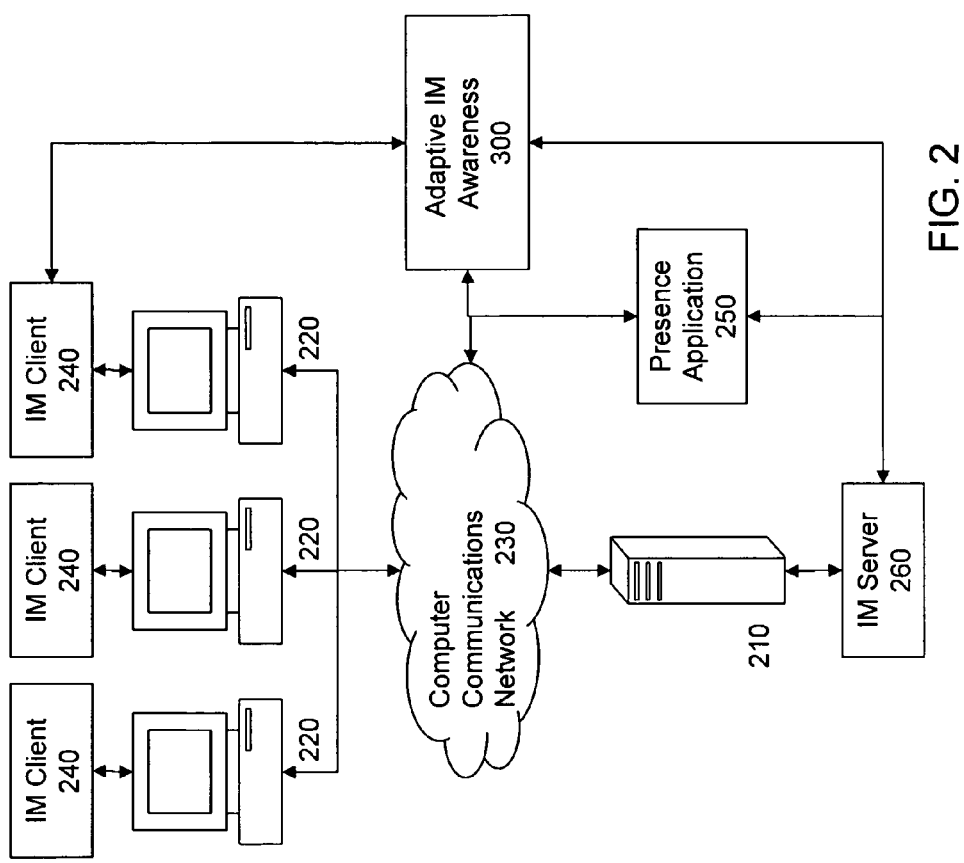
FIG. 2 is a schematic illustration of an instant messaging system configured for delaying transmission of an instant message according to availability; and, FIG. 3 is a flow chart illustrating a process for delaying transmission of an instant message according to availability in an instant messaging system.

The process shown in FIG. 1 can be embodied within an instant messaging data processing system. To that end, FIG. 2 is a schematic illustration of an instant messaging system configured for adaptive presence awareness. The system can include a host server 210 configured for communicative coupling to one or more clients 220 over computer communications network 230. The host server 210 can support the operation of an instant messaging server 260 managing instant messaging sessions amongst instant messaging clients 240, each hosted within a corresponding one of the computer clients 220.

Notably, adaptive instant messaging awareness logic 300 can be coupled to the instant messaging server 260, the instant messaging clients 240, or both. The adaptive instant messaging awareness logic 300 further can be coupled to a presence application 250 (such as a presence server) resident in the instant messaging server 260, instant messaging clients 240 or both. The presence application 250 can serve presence information, which is a status indicator that conveys ability and willingness of a potential communication partner. A user's client provides presence information via a network connection to a presence server, which stores the presence information in a user's personal availability record and can be made available for distribution to other users to convey his availability for communication.

The adaptive instant messaging awareness logic 300 can include program code enabled to delay the transmission of an instant message via instant messaging server 260 to a particular user in response to determining the lack of availability of the particular user.

Optionally, a relationship of trust can be specified for different presence applications 250 coupled to the adaptive instant messaging awareness logic 300 such that once trusted, a presence application 250 can invoke the program code of the adaptive instant messaging awareness logic 300 in order to automatically delay the transmission of an instant message to a particular user or prompt the sender to do the same. In this regard, the adaptive instant messaging awareness logic 300 can expose an interface to the presence application 250 through which the presence application 250, when trusted, can invoke the adaptive instant messaging awareness logic 300 to delay the transmission of the instant message to a particular user or prompt the sender to do the same.

Figure 3:
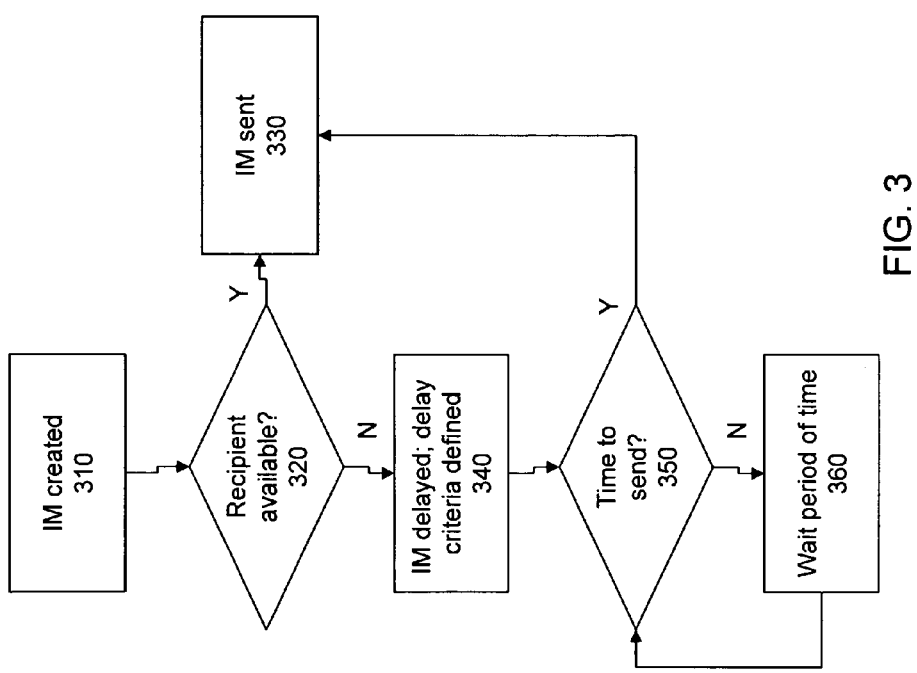

In yet further illustration of the operation of the adaptive instant messaging awareness logic 300, FIG. 3 is a flow chart illustrating a process for delaying transmission of an instant message according to availability in an instant messaging system. Beginning in block 310, a sending user, such as user 111 of FIG. 1, creates an instant message intended for delivery to user 112, who happens to be away from his computer therefore not currently present to receive an instant message. In block 320, the presence awareness state for the user 112 can be identified by presence application 250 and it is determined whether or not the user 112 is available. Availability may be determined based on this presence status, such as "available," "on/off line" or "do not disturb." If the user 112 is available, in block 330 the instant message is sent. If the user 112 is not available, in block 340 the instant message is delayed in any of a variety of ways specified by delay criteria defined by user 111.

In one embodiment of block 340, the sending user 111 is provided a "Delay Send" user interface widget accessible from his instant messaging user interface. By using the widget, the user 11 can choose to send the message at a later time defined by the user 111. The user interface widget may be a button, a pull down menu selection, a selection available from a right-click action, or the like. In another embodiment of block 340, the sending user 111 is automatically provided a separate user interface that warns the sending user 111 that user 112 is not currently available. At this point, the user 111 may choose to proceed with delaying the transmission of the instant message. In a case where more than one out of multiple instant message recipients are not available, the user 111 may choose to delay sending the instant message to all recipients or only the ones that are not available.

In another embodiment of block 340, the sending user 111 is automatically provided a separate user interface that allows the sending user 111 to specify when the instant message shall be sent. For example, the user 111 may specify that the instant message shall be as soon as possible when the user 112 is available. Or, the user 111 may specify that the instant message shall be sent between certain times, such as 2-3 pm, on the same day when the non-available user 112 becomes available. Alternatively, the user 111 may specify that the instant message shall be sent after a predefined period of time such as 10 minutes on the same day when the non-available user 112 becomes available. In another alternative, the user 111 may specify that the instant message shall be sent when the non-available user 112 only has a certain number of chat windows open. Availability of a user for an instant messaging session may be determined using his instant message presence status, his calendar status or the like.

In decision block 350, it is determined whether it is time to send the instant message according to the delay criteria defined in step 340. As discussed above, various factors may be taken into account when defining a delay criteria, such as the time of day, the instant message presence status of the user(s), the calendar status of the user(s) or the like. If the result of the determination of step 350 is positive, then the instant message is sent in step 330. Otherwise, a period of time is allowed to pass in block 360 and the control flows back to block 350.

In one embodiment of the present invention, if a predetermined amount of time passes before the instant message is transmitted via block 330, the present invention sends a message to the sending user 111 indicating that an appropriate time to send the instant message to user 112 was not found. At this point, the sending user 111 may specify different delay criteria for sending the instant message.

It should be noted that although the discussion above is directed to a situation where one user 112 is not currently available for an instant messaging session, the present invention further supports the delayed transmission of instant messages to multiple users that are not currently available for an instant messaging session.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An adaptive instant messaging awareness method comprising:
    receiving from a first user via an instant messaging user interface an instant message for transmission to a second user of an instant messaging system;
    determining that the second user is not currently available to receive an instant message by
        querying a presence server that stores presence information for the second user, and
        receiving an indicator from the presence server that the second user is not available to receive an instant message; and
    providing the first user a separate user interface that warns the first user that the second user is not currently available and allows the first user to specify whether the instant message is sent and at least one of a time and a date in the separate user interface when the instant message shall be sent by the instant messaging system upon the first user determining that the instant message shall be sent.

2. The method of claim 1, wherein the separate user interface is automatically provided to the first user upon determining that the second user is not currently available to receive the instant message.

3. The method of claim 1, wherein the separate user interface is activated from the instant messaging user interface by the first user.

4. The method of claim 1, wherein the first user specifying whether the instant message is sent and at least one of the time and the date comprises the first user specifying that the instant message shall be sent as soon as the second user becomes available, during a predefined time period on a day when the second user becomes available, or after a predefined period of time when the second user becomes available.

5. The method of claim 1, wherein the first user specifying whether the instant message is sent and at least one of the time and the date comprises the first user specifying that the instant message shall be sent when the second user becomes available and only when the second user has a threshold number of instant messaging user interfaces open.

6. The method of claim 1, further comprising:
    determining that a predetermined amount of time has passed before the instant message has been sent to the second user;
    sending a message to the first user that the message has not been sent within the predetermined amount of time; and,
    enabling the first user to again specify whether the instant is sent and at least one of a new time and a new date when the instant message shall be sent.

7. A computer program product comprising a non-transitory computer-readable storage medium having stored therein computer usable program code for adaptive instant messaging awareness, the computer usable program code, which when executed by a data processing hardware system, causing the data processing hardware system to perform the operations of receiving from a first user via an instant messaging user interface an instant message for transmission to a second user of an instant messaging system;

determining that the second user is not currently available to receive an instant message by querying a presence server that stores presence information for the second user, and receiving an indicator from the presence server that the second user is not available to receive an instant message; and providing the first user a separate user interface that warns the first user that the second user is not currently available and allows the first user to specify whether the instant message is sent and at least one of a time and a date in the separate user interface when the instant message shall be sent by the instant messaging system upon the first user determining that the instant message shall be sent.

8. The computer program product of claim 7, wherein the separate user interface is automatically provided to the first user upon determining that the second user is not currently available to receive the instant message.

9. The computer program product of claim 7, wherein the separate user interface is activated from the instant messaging user interface by the first user.

10. The computer program product of claim 7, wherein the first user specifying whether the instant message is sent and at least one of the time and the date comprises the first user specifying that the instant message shall be sent as soon as the second user becomes available, during a predefined time period on a day when the second user becomes available, or after a predefined period of time when the second user becomes available.

11. The computer program product of claim 7, wherein the first user specifying whether the instant message is sent and at least one of the time and the date comprises the first user specifying that the instant message shall be sent when the second user becomes available and only when the second user has a threshold number of instant messaging user interfaces open.

12. The computer program product of claim 7, wherein the computer usable program code further causes the data processing hardware system to perform the operations of:

determining that a predetermined amount of time has passed before the instant message has been sent to the second user;

sending a message to the first user that the message has not been sent within the predetermined amount of time; and, enabling the first user to again specify whether the instant is sent and at least one of a new time and a new date when the instant message shall be sent.

13. An adaptive instant messaging awareness data processing system, comprising:

a processor configured for receiving from a first user via an instant messaging user interface an instant message for transmission to a second user of an instant messaging system;

determining that the second user is not currently available to receive an instant message by querying a presence server that stores presence information for the second user, and receiving an indicator from the presence server that the second user is not available to receive an instant message; and providing the first user a separate user interface that warns the first user that the second user is not currently available and allows the first user to specify whether the instant message is sent and at least one of a time and a date in the separate user interface when the instant message shall be sent by the instant messaging system upon the first user determining that the instant message shall be sent.

14. The system of claim 13, wherein the separate user interface is automatically provided to the first user upon determining that the second user is not currently available to receive the instant message.

15. The system of claim 13, wherein the separate user interface is activated from the instant messaging user interface by the first user.

16. The system of claim 13, wherein the first user specifying whether the instant message is sent and at least one of the time and the date comprises the first user specifying that the instant message shall be sent as soon as the second user becomes available, during a predefined time period on a day when the second user becomes available, or after a predefined period of time when the second user becomes available.

17. The system of claim 13, wherein the first user specifying whether the instant message is sent and at least one of the time and the date comprises the first user specifying that the instant message shall be sent when the second user becomes available and only when the second user has a threshold number of instant messaging user interfaces open.

18. The system of claim 13, wherein the processor is further configured for:

determining that a predetermined amount of time has passed before the instant message has been sent to the second user;

sending a message to the first user that the message has not been sent within the predetermined amount of time; and, enabling the first user to again specify whether the instant is sent and at least one of a new time and a new date when the instant message shall be sent.

\* \* \* \* \*